United States Patent
Larson et al.

(10) Patent No.: US 9,834,634 B2
(45) Date of Patent: Dec. 5, 2017

(54) ACRYLIC RESINS AND POWDER COATING COMPOSITIONS AND POWDER COATED SUBSTRATES INCLUDING THE SAME

(71) Applicant: Akzo Nobel Coatings International B.V., Arnhem (NL)

(72) Inventors: Gary Robert Larson, Harleysville, PA (US); Justin E. Wilhelm, Shillington, PA (US); Douglas Samuel Cinoman, Goodyear, AZ (US)

(73) Assignee: AKZO NOBEL COATINGS INTERNATIONAL, B.V., Arnhem (NL)

( * ) Notice: Subject to any disclaimer, the term of this patent is extended or adjusted under 35 U.S.C. 154(b) by 0 days.

(21) Appl. No.: 15/121,681

(22) PCT Filed: Feb. 25, 2015

(86) PCT No.: PCT/EP2015/053903
§ 371 (c)(1),
(2) Date: Aug. 25, 2016

(87) PCT Pub. No.: WO2015/128361
PCT Pub. Date: Sep. 3, 2015

(65) Prior Publication Data
US 2016/0355626 A1 Dec. 8, 2016

Related U.S. Application Data

(60) Provisional application No. 61/945,523, filed on Feb. 27, 2014.

(30) Foreign Application Priority Data

Apr. 8, 2014 (EP) ..................................... 14163894

(51) Int. Cl.
| | |
|---|---|
| *C08F 118/02* | (2006.01) |
| *C08F 220/32* | (2006.01) |
| *C09D 4/00* | (2006.01) |
| *C08F 220/18* | (2006.01) |
| *C08L 33/06* | (2006.01) |
| *C09D 5/03* | (2006.01) |
| *C09D 5/08* | (2006.01) |
| *C09D 133/14* | (2006.01) |

(52) U.S. Cl.
CPC .......... *C08F 220/32* (2013.01); *C08F 220/18* (2013.01); *C08L 33/068* (2013.01); *C09D 4/00* (2013.01); *C09D 5/03* (2013.01); *C09D 5/08* (2013.01); *C09D 133/14* (2013.01); *C08F 2220/325* (2013.01)

(58) Field of Classification Search
CPC ............... C08F 220/32; C08F 220/18; C08F 2220/325; C09D 4/00; C09D 5/03; C09D 5/08; C09D 133/14; C08L 33/068
USPC ....... 525/187, 125, 176, 55; 526/319, 328.5, 526/328
See application file for complete search history.

(56) References Cited

U.S. PATENT DOCUMENTS

| | | | |
|---|---|---|---|
| 3,873,493 A | 3/1975 | Labana et al. | |
| 5,407,707 A | 4/1995 | Simeone et al. | |
| 5,663,240 A | 9/1997 | Simeone et al. | |
| 7,737,238 B2 | 6/2010 | Lu et al. | |
| 2003/0050511 A1 | 3/2003 | Gilmore et al. | |
| 2007/0078235 A1 | 4/2007 | Lu et al. | |
| 2009/0227708 A1* | 9/2009 | Daly ................. | C09D 5/03 523/400 |
| 2009/0227752 A1 | 9/2009 | Lu et al. | |
| 2013/0273287 A1 | 10/2013 | Luo et al. | |

FOREIGN PATENT DOCUMENTS

| | | |
|---|---|---|
| DE | 2261392 | 6/1973 |
| EP | 0566096 A1 | 10/1993 |
| EP | 2077299 A1 | 7/2009 |

OTHER PUBLICATIONS

European Search Report for EP 14163894.0, dated Sep. 16, 2014.
International Search Report and Written Opinion for PCT/EP2015/053903, dated Apr. 1, 2015.

* cited by examiner

*Primary Examiner* — David T Karst
(74) *Attorney, Agent, or Firm* — Nirav P. Patel

(57) ABSTRACT

An epoxy functional acrylic resin having a $T_g$ of greater than 85° C. and a calculated solubility parameter from about 9.20 to about 9.30 $(cal/cm^3)^{1/2}$, powder coating compositions including the same and coated substrates coated with the powder coating composition is described. The resin includes, as copolymerized monomers, from about 10 wt. % to about 40 wt. % of one or more epoxy functional unsaturated monomers; from about 10 wt. % to about 20 wt. % of one or more hydrophobic acrylic monomers, and from greater than 50 wt. % to about 75 wt. % of at least one nonionic copolymer that is different from the hydrophobic acrylic monomers ii), each monomer wt. % based on the total weight of copolymerized monomers in the resin.

14 Claims, No Drawings

ACRYLIC RESINS AND POWDER COATING COMPOSITIONS AND POWDER COATED SUBSTRATES INCLUDING THE SAME

This application is a national stage filing under 35 U.S.C. §371 of PCT/EP2015/053903, filed Feb. 25, 2015, which claims priority to U.S. Application No. 61/945,523, filed Feb. 27, 2014 and European Patent Application No. 14163894.0, filed Apr. 8, 2014, the contents of which are each incorporated herein by reference in their entirety.

TECHNICAL FIELD

Thermosetting epoxy functional acrylic resins and powder coating compositions containing said resins are disclosed herein. When formulated into a clear powder coating and when this coating is applied to substrates, such as machined aluminum automotive wheels, powder coating compositions including the such epoxy functional acrylic resins provide excellent filiform and CASS corrosion resistance while maintaining an excellent appearance and impact resistance.

BACKGROUND

The exposed portions of metal vehicle wheels can be abraded by grit and other debris from road surfaces. A hard and tough film is needed to protect the metal wheel surface. The film should be non-porous and should exhibit superior adhesion to the metal. These properties can prevent the spread of corrosion at the interface of the film and metal. However, the appearance of filiform corrosion, such as visible pitting of the coating, is not necessary for the growth of filiform corrosion. Over time, comparable film thicknesses of conventional acrylic and polyester protective clear coat powder coatings formed on aluminum wheels exhibited filiform corrosion even though the coatings appeared acceptable.

Clear coats for aluminum wheels often are applied over self-assembled monolayer (SAM) wheel surface pretreatments. Pretreating the surface with a SAM can retain the bright color and appearance of the aluminum without incorporating chrome-containing compounds. Nevertheless, clear coats applied over SAM pretreatments may still fail to provide adequate filiform corrosion resistance. Polyester clear coats applied over pre-treated aluminum wheels and trim can provide adequate filiform corrosion resistance if the clear coat is overlaid with a liquid coating to provide adequate chemical resistance, scratch resistance and weatherability.

Epoxy-containing acrylic powder compositions are also known. U.S. Pat. Nos. 5,407,707 and 5,663,240, (Simeone, et al.), disclose powder coating compositions that include epoxy functional acrylate polymers. These compositions may provide acceptable appearance when coated over a color coat but lack acceptable weatherability. German Pat. No. DE 22 61 392 A1 (Ford Werke AG) discloses powders formed from glycidyl acrylic copolymers for flexible moldings. The powders are not suitable for coatings and do not provide a weatherable molding.

U.S. Pat. App. Pub. No. 2007/0078235 A1 (Lu, et al.) discloses powder coating compositions comprising copolymers of glycidyl (meth)acrylate and caprolactone (meth) acrylate. These powder coating compositions do not exhibit filiform corrosion resistance that is better than conventional epoxy functional acrylic clear coat powder coatings.

U.S. Pat. No. 7,737,238 discloses powder coating resins comprising from 20 to 55 weight % of glycidyl acrylate (GA) or glycidyl methacrylate (GMA), preferably 25 to 50 weight %, and from 3 to 20 weight % of at least one selected from the group consisting of isobutyl methacrylate (IBMA), isobornyl acrylate (IBOA) and isobornyl methacrylate (IBOMA), preferably 5 to 15 weight %, and from 25 to 65 weight % of at least one copolymerizable ethylenically unsaturated monomer, preferably 30 to 50 weight %. These resins do not exhibit high glass transition temperatures (for example, $T_g$ greater than 85° C.) in combination with a solubility parameter exceeding 9.15 $(cal/cm^3)^{1/2}$.

European Pat. No. EP 0566096 discloses the preparation and use of a cathodic electrodeposition paint that exhibit defects in the absence of a cationic acrylic copolymer. However, the copolymer adversely affects paint adhesion unless the copolymer exhibits a hydroxyl number greater than 40.

Accordingly, there is still a need for epoxy functional acrylic resins suitable for powder coating compositions that can provide improved filiform and CASS corrosion resistant powder coatings for aluminum, forged alloy or metal substrates without impairing powder coating smoothness, clarity or powder coating composition stability and impact resistance, especially in powder coatings for aluminum or forged alloy wheels and automotive trim pretreated with, for example, hexavalent chromium-free pretreatments.

SUMMARY

Embodiments according to the present disclosure are directed to an epoxy functional acrylic resin comprising, as copolymerized monomers, from about 10 percent by weight (wt. %) to about 40 wt. % of one or more epoxy functional unsaturated monomers, from about 10 wt. % to about 20 wt. % of one or more hydrophobic acrylic monomers, and from greater than 50 wt. % to about 75 wt. % of at least one nonionic copolymer that is different from the hydrophobic acrylic monomers, each monomer wt. % based on the total weight of copolymerized monomers in the resin. The resin also has a $T_g$ of greater than 85 degrees Celsius (° C.) and a calculated solubility parameter from about 9.20 to about 9.30 $(cal/cm^3)^{1/2}$.

Some embodiments of epoxy functional acrylic resins may be included in a powder coating composition. For example, a powder coating composition suitable for coating bare or untreated metal surfaces may include an epoxy functional acrylic resin and one or more crosslinkers for the resin. Such powder coatings may be used to protect metal surfaces exposed to corrosive or abrasive environments. For example, powder coating compositions including an epoxy functional acrylic resin according to the present disclosure may be used to coat a cast or forged aluminum or aluminum alloy substrate, such as a wheel or trim for a vehicle.

DETAILED DESCRIPTION

Embodiments of epoxy functional acrylic resins capable of providing improved filiform and CASS corrosion resistance and used for clear coat or tinted clear coat powder coating compositions are described herein. The epoxy functional acrylic resins may include, as copolymerized monomers, i) from about 10 to about 40 wt. % of one or more epoxy functional unsaturated monomers, e.g. glycidyl (meth)acrylate; ii) from about 10 wt. % to about 20 wt. % of one or more hydrophobic acrylic monomers and iii) from 51 wt. % to about 75 wt. % of one or more ethylenically unsaturated monomers that differ from the hydrophobic acrylic monomer ii). The epoxy functional resins have a $T_g$ of greater than 85° C., a hydroxyl number of zero, and a calculated solubility parameter from about 9.20 to about 9.30 (cal/cm$^3$)$^{1/2}$. In some embodiments, the epoxy functional acrylic resin may further comprise 12 wt. % or less of a vinyl aromatic monomer iv), based on the total weight of copolymerized monomers in the epoxy functional acrylic resin. Such epoxy functional acrylic resins provide improvement to filiform and CASS corrosion resistance in clear coat or tinted clear coat powder coating compositions. Further, powder coating compositions including the resins do not exhibit the rough microtexture or heavy "orange peel" appearance that is characteristic of other resins having a $T_g$ of 85° C. or higher.

Embodiments of the epoxy functional acrylic resins described herein may be included in powder coating compositions. Powder coating compositions may be applied to metal substrates, whether pre-treated, pre-coated, or bare. For example, embodiments of the powder coating compositions disclosed herein may be applied to aluminum or forged alloy substrates. Such substrates may be cleaned and pre-treated with zinc phosphate, iron phosphate, or other suitable pretreatments. Suitable substrates include aluminum wheels and automotive trim. Some embodiments of such powder coating compositions may include one or more adjuvants chosen from a hydrophobic submicron particle, an adhesion promoter, a light stabilizer, and an ultraviolet (UV) absorber.

In some embodiments, a powder coating composition may include one epoxy functional acrylic resin, or a mixture of two or more resins, and one or more crosslinker. The resin mixtures may comprise an epoxy functional acrylic resin and one or more second resins. Non-limiting examples of the second resin include a second epoxy functional acrylic resin, a copolymerization product of one or more carboxylic acid functional monomers and one or more nonionic comonomers, a copolymerization product of one or more phosphorus acid functional monomers and one or more nonionic comonomer, and mixtures or combinations thereof. In some embodiments, the second resin is preferably substantially free from copolymerized hydrophobic acrylic monomer (ii); i.e. the hydrophobic acrylic monomer ii) comprises 2.0 wt. % or less, based on the total weight of copolymerized monomer in the copolymer. In some embodiments, a powder coating composition may include one or more adhesion promoter, such as an epoxy resin.

In some embodiments, an epoxy functional acrylic resin preferably comprises a mixture of one or more epoxy functional acrylic resins that is substantially free from copolymerized vinyl aromatic monomer (iv), and the one or more second resin comprises the copolymerization product of 30 wt. % or less of one or more vinyl aromatic comonomer (iv), e.g. styrene or vinyl toluene, based on the total weight of copolymerized monomers in the second copolymer(s).

In another embodiment, the epoxy functional acrylic resin preferably comprises an epoxy functional acrylic resin and one or more second epoxy functional acrylic resins that is substantially free from copolymerized hydrophobic acrylic monomer (ii), wherein the total amount of the copolymerized hydrophobic acrylic monomer (ii) ranges from 10.0 wt. % to 20 wt. %, based on the total weight of the copolymerized monomers in the epoxy functional acrylic resin. In an embodiment, the second epoxy functional acrylic resin more preferably further comprises in copolymerized form up to 30 wt. %, one or more vinyl aromatic monomer iv), based on the total weight of the copolymerized monomers in the epoxy functional acrylic resin.

In some embodiments, one or more crosslinkers may include an organic dicarboxylic acid, anhydride, or an adduct thereof with a polyester or a polyisocyanate.

Embodiments of the epoxy functional acrylic resins described herein may be used to produce clear or tinted powder coatings exhibiting excellent filiform and CASS corrosion resistance on aluminum or forged alloy substrates, such as automotive wheel substrates, using conventional coating application techniques. The powder coating compositions enable improved filiform and CASS corrosion resistance, along with excellent appearance, good color and excellent blocking resistance. The powder coating compositions described herein provide filiform and CASS corrosion resistant coatings used to coat surfaces of iron, steel, magnesium alloy and brass substrates.

The powder coating compositions described herein include an epoxy functional acrylic resin including a copolymer or copolymer mixture that comprises, based on the total weight of copolymerized monomers in the epoxy functional acrylic copolymer component, i) from about 10 to about 40 wt. % of one or more epoxy functional unsaturated monomer, e.g. glycidyl (meth)acrylate; ii) from about 10 wt. % to about 20 wt. %, of one or more hydrophobic acrylic monomers, and iii) the remainder of one or more nonionic comonomer that differs from hydrophobic acrylic monomer ii). The epoxy functional acrylic copolymer component may additionally comprise copolymerized vinyl aromatic monomer iv) in the amount of 3 wt. % or more, or 12 wt. % or less or, preferably, 8.5 wt. % or less, based on the total weight of copolymerized monomers in the epoxy functional acrylic copolymer component.

To make resins comprising mixtures of one or more resin components, the resins may be mixed, for example, at any time after polymerization, or one resin may be copolymerized in the presence of an already formed resin.

Suitable second copolymers for admixture with the epoxy functional acrylic copolymer may be chosen epoxy functional acrylic copolymers, epoxy functional vinyl copolymers, carboxylic acid functional acrylic copolymers, carboxylic acid functional vinyl copolymers, phosphorus acid functional acrylic copolymers, phosphorus acid functional vinyl copolymers, and mixtures and combinations thereof. The amount of one or more second acrylic copolymer, based on the total weight of acrylic copolymers in the mixture, may range from, in an embodiment from about 1 to about 60 wt. %, in another embodiment preferably, about 10 to about 50 wt. %, or, in yet another embodiment more preferably, about 40 wt. % or less.

In embodiments where the second acrylic copolymer comprises the copolymerization product of one or more carboxylic acid functional monomer and one or more comonomer, the carboxylic acid functional monomer may be used in amounts of up to about 10 wt. %, or, about 0.1 wt. % or more, preferably, about 5 wt. % or less, based on the total weight of copolymerized monomers in the copolymer.

In embodiments where the second acrylic copolymer comprises the copolymerization product of one or more phosphorus acid functional monomer and one or more comonomer, the phosphorus acid functional monomer may be used in amounts of up to 5 wt. %, or, 0.1 wt. % or more, preferably, or 3 wt. % or less, based on the total weight of copolymerized monomers in the copolymer.

In an embodiment, the epoxy functional acrylic copolymer component comprises a mixture of one or more epoxy functional acrylic copolymer with one or more second copolymer that is substantially free from copolymerized hydrophobic acrylic monomer ii). Preferably, the second copolymer comprises the copolymerization product of i) from 5 to 80 wt. %, based on the total weight of copolymerized monomers, of one or more epoxy functional unsaturated monomer, and one or more nonionic comonomer iii).

In another embodiment, the epoxy functional acrylic copolymer component comprises one or more epoxy functional acrylic copolymer that is substantially free from copolymerized vinyl aromatic monomer iv) and one or more second copolymer. In yet another embodiment, preferably, the second copolymer comprises from 2 to 30 wt. %, or 25 wt. % or less of copolymerized vinyl aromatic monomer iv), based on the total weight of copolymerized monomers in the second copolymer.

Other suitable polymer mixtures may include, for example, mixtures of one or more epoxy functional acrylic copolymer with a second copolymer chosen from an epoxy functional acrylic copolymer that is substantially free from copolymerized vinyl aromatic monomer iv), a carboxylic acid functional acrylic copolymer that is substantially free from copolymerized vinyl aromatic monomer iv), a phosphorus acid functional acrylic copolymer that is substantially free from copolymerized vinyl aromatic monomer iv), and mixtures thereof.

Suitable epoxy functional unsaturated monomers i) for use in making any epoxy functional acrylic copolymer may include, for example, one or more glycidyl ester of α-β ethylenically unsaturated carboxylic acids, such as (meth) acrylic, maleic or itaconic acid, and allyl glycidyl ethers. Preferably, the epoxy functional monomer is chosen from glycidyl (meth)acrylate monomers of the formula $H_2C=C(R^8)C(O)OR^9$, wherein $R^8$ is H or a lower alkyl group and $R^9$ is a glycidyl terminal, branched or unbranched alkylene residue containing from 1 to 4 carbon atoms, i.e. the glycidyl ring lies at the end distal to the unsaturation. Illustrative compounds within the definition of formula (I) are glycidyl acrylate, glycidyl (meth)acrylate, and 1,2-epoxybutylacrylate, preferably, glycidyl (meth)acrylate of formula, wherein $R^8$ is methyl and $R^9$ is a glycidyl methylene group. Glycidyl (meth)acrylate monomers may comprise a mixture of monomers of formula I. Glycidyl (meth)acrylate, can be obtained commercially from The Dow Chemical Company (Midland, Mich.) or the glycidyl (meth)acrylate monomer can be prepared under reaction conditions conventional to those of skill in the art.

The amount of epoxy functional unsaturated monomers i) used to obtain the epoxy functional acrylic resin ranges from about 10 wt. % to about 40 wt. % epoxy functional unsaturated monomer, based on the total weight of copolymerized monomers in the epoxy functional acrylic copolymer component. In another embodiment, the amount of epoxy functional unsaturated monomers used is from about 20 wt. % to about 35 wt. %, and in yet another embodiment from about 25 wt. % to about 30 wt. %. If the amount of the epoxy functional unsaturated monomer used is less than about 10 wt. %, based on the total weight of copolymerized monomers, it does not measurably contribute to an improvement of solvent resistance and mechanical strength. On the other hand, if the amount exceeds about 40% by weight, no additional improvement in corrosion resistance is obtained.

Suitable hydrophobic acrylic monomers ii) may include, for example, one or more monomer chosen from isobornyl (meth)acrylate, dicyclopentadienyl (meth)acrylate, dihydrocyclopentadienyl (meth)acrylate, 2-ethylhexyl (meth)acrylate, cyclohexyl (meth)acrylate, benzyl (meth)acrylate, phenyl (meth)acrylate, and t-butyl (meth)acrylate. Such monomers improve the filiform corrosion resistance of weatherable coatings on aluminum, such as aluminum wheels. In an embodiment, the hydrophobic acrylic monomer is preferably chosen from bicyclic cycloalkyl (meth)acrylates, such as dicyclopentadienyl (meth)acrylates and isobornyl (meth)acrylates.

In an embodiment, the one or more hydrophobic acrylic monomers ii) may also have a mass solubility in water of 3.5 g/L or less, and in another embodiment preferably, 2.5 g/L or less, and which would itself form a homopolymer having a glass transition temperature ($T_g$) in a range of 50° C. to 175° C., and in another embodiment preferably, about 65° C. to about 175° C. In some embodiments, the hydrophobic acrylic monomers ii) may be substantially free of hydroxyl functional groups and have a hydroxyl number of 0.

The amount of hydrophobic acrylic monomers ii) used to obtain the epoxy functional acrylic resin ranges from about 5 wt. % to about 25 wt. % based on the total weight of copolymerized monomers in the epoxy functional acrylic copolymer component. In another embodiment, the amount of hydrophobic acrylic monomers used is preferably from about 10 wt. % to about 20 wt. %.

Non-limiting examples of Nonionic comonomers iii) include one or more of any nonionic acrylic, vinyl or allyl monomer, such as, for example, one or more monomer chosen from alkyl (meth)acrylates, cycloalkyl (meth)acrylates, alkyl aryl (meth)acrylates vinyl esters, alkyl vinyl ethers, (meth)acrylonitriles, (meth)acrylamides, dialkyl esters of unsaturated dibasic acids, polyalkoxylated alkyl (meth)acrylates having from 1 to 20 alkoxy groups, and mixtures thereof. Unless otherwise indicated, nonionic comonomers include hydrophobic comonomers ii) and vinyl aromatic monomers (iv). In an embodiment, the nonionic comonomer preferably has a mass solubility in water of 30 g/L or less, or, preferably, 25 g/L or less. In some embodiments, the nonionic comonomer iii) may be substantially free of hydroxyl groups and have a hydroxyl number of 0.

In some embodiments, the nonionic comonomers iii) may be chosen from cycloalkyl (meth)acrylates iii) a), such as $C_1$ to $C_{20}$ (cyclo)alkyl esters of (meth)acrylic acid, such as methyl (meth)acrylate, ethyl (meth)acrylate, n-butyl (meth)acrylate, isobutyl (meth)acrylate, 2-ethylhexyl (meth)acrylate, cyclohexyl acrylate, lauryl (meth)acrylate, stearyl (meth)acrylate, eicosyl (meth)acrylate and cetyl (meth)acrylate, as well as tridecyl (meth)acrylate, and mixtures thereof. In an embodiment, the comonomers iii) a) preferably comprise one or more $C_1$ to $C_8$ (cyclo)alkyl ester of (meth) acrylic acid, such as butyl (meth)acrylate and methyl methacrylate.

In some other embodiments, the epoxy functional resins may further comprise vinyl monomers iv), including alkyl aryl (meth)acrylates vinyl esters and alkyl vinyl ethers. In an embodiment, the vinyl monomers are preferably vinyl aromatic monomers chosen from styrene, α-methyl styrene, α-ethylstyrene and other α-alkyl substituted styrenes, vinyl toluene, divinyl benzene, vinyl esters, e.g. vinyl acetates, vinyl ethers, allyl ethers, allyl alcohols, and mixtures thereof.

In an embodiment, the amount of copolymerized vinyl comonomer (iv) used, ranges from about 0.5 wt. % to about 12 wt. %, and in another embodiment from about 1 wt. % to about 8 wt. %, based on the total weight of copolymerized monomers in the epoxy functional acrylic copolymer component. In another embodiment, the amount of vinyl comonomer (iv) is preferably from about 2 wt. % to about 6 wt. %.

The epoxy functional acrylic resins have a calculated $T_g$ of greater than 85° C., and in some embodiments they may have a calculated $T_g$ preferably about 90° C. or greater, and in still other embodiments they may more preferably have a calculated $T_g$ from about 90° C. to about 100° C. Retaining a suitable acrylic copolymer $T_g$ ensures adequate blocking resistance or package stability while retaining adequate flow and film-forming properties.

The epoxy functional acrylic resins also have a calculated solubility parameter, $SP_c$, about 9.18 (cal/cm³)^(1/2) or greater. In another embodiment, the resin preferably has a $SP_c$ from about 9.20 to about 9.50, and in yet another embodiment from about 9.23 to about 9.30. The $SP_c$ is defined as:

$$SP_c = \frac{\left(\frac{W1 \times SP1}{d1} + \frac{W2 \times SP2}{d2} + \frac{W3 \times SP3}{d3} + \cdots\right)}{\left(\frac{W1}{d1} + \frac{W2}{d2} + \frac{W3}{d3} + \cdots\right)}$$

where SPc is the calculated solubility parameter of the resin; W1, W2, W3 . . . is the weight ratio of each individual monomer; d1, d2, d3 . . . is the specific density of each individual monomer; and SP1, SP2, SP3 . . . is the solubility parameter of homopolymer of each individual monomer.

The solubility parameter used for the above calculations can be found, for example, in a monomer supplier's data sheet or published literature such as "Polymer Handbook" (4th Edition, John Wiley, New York, 1999). A list of monomer-homopolymer $T_g$ and SP for some selected free radical polymerizable monomers is included in the following Table 1.

TABLE 1

| Monomer | Homopolymer $T_g$, (° C.) | Homopolymer Solubility Parameter, (cal/cm³)^(1/2) | Specific Gravity |
|---|---|---|---|
| Butyl acrylate | −56 | 9.0 | 0.894 |
| Butyl methacrylate | 20 | 8.8 | 0.896 |
| Ethyl methacrylate | 65 | 9.0 | 0.914 |
| Glycidyl methacrylate | 46 | 9.45 | 1.073 |
| n-Octyl methacrylate | 20 | 8.4 | 0.890 |
| Isobornyl acrylate | 94 | 8.2 | 0.987 |
| Isobornyl methacrylate | 170 | 8.1 | 0.979 |
| Iso butyl methacrylate | 48 | 7.2 | 0.884 |
| Lauryl methacrylate | −65 | 8.2 | 0.872 |
| Methyl methacrylate | 105 | 9.5 | 0.994 |
| Stearyl methacrylate | 38 | 7.8 | 0.864 |
| Styrene | 100 | 8.7 | 0.9048 |

In some embodiments, the epoxy functional acrylic resins may be substantially free of hydroxyl functionality and have a calculated hydroxyl number of 0.

In some embodiments the epoxy functional acrylic resins may have a functionality per molecule (f/M) value of less than 14. In another embodiment, the resin preferably has a f/M value from about 5 to about 13.5, and in yet another embodiment, an f/M value from about 10 to about 13.5. The f/M value is calculated from Mw/EEW. The Mw may be determined by Gel Permeation Chromatography (GPC). The EEW may be determined by the acetic acid/perchloric acid method (ASTM D 1652-04) using a Metrohm Autotitrator equipped with a 808 Titrando and a 805 Dosimat unit.

Suitable carboxylic acid functional acrylic copolymers for use in the powder coating composition with the epoxy functional acrylic copolymer component may comprise any copolymer having a weight average molecular weight of between about 1000 and about 30,000, and a carboxylic acid equivalent weight of from about 300 to about 1000, preferably at least about 500, the copolymerization product of from 2.5 to 25 wt. %, based on the total weight of copolymerized monomers, of one or more α-β ethylenically unsaturated carboxylic acid, and one or more nonionic comonomer. Examples of suitable carboxylic acid functional acrylic copolymers are Joncryl™ 819 and Joncryl™ 821 from BASF Corporation, Wyandotte, Mich.

Suitable α-β ethylenically unsaturated carboxylic acid monomers for making the carboxylic acid functional acrylic copolymer may include, for example, acrylic acid, methacrylic acid, acryloxypropionic acid, crotonic acid, fumaric acid, monoalkyl esters of fumaric acid, maleic acid, monoalkyl esters of maleic acid, itaconic acid, monoalkyl esters of itaconic acid and mixtures thereof.

Phosphorus acid functional acrylic copolymers suitable for use in the epoxy functional acrylic copolymer component may comprise the copolymerization product of i) from 0.5 to 10 wt. %, preferably, 1 to 5 wt. %, based on the total weight of copolymerized monomers, of one or more phosphorus acid monomer, and one or more nonionic comonomer. The phosphorus acid functional acrylic copolymer may further comprise the copolymerization product of up to 10 wt. %, preferably, from 1 to 5 wt. %, based on the total weight of copolymerized monomers, of one or more α-β ethylenically unsaturated carboxylic acid. The acrylic copolymer may comprise mixtures of one or more phosphorus acid functional acrylic copolymer and one or more epoxy functional acrylic copolymer.

Suitable phosphorus acid monomers for making the phosphorus acid functional acrylic copolymer can be any α-β ethylenically unsaturated monomer having a phosphorus acid group and may be in the acid form or as the salt of the phosphorus acid group. Phosphorus acid monomers may include, for example, phosphoalkyl (meth)acrylates such as phosphoethyl (meth)acrylate, phosphopropyl (meth)acrylate, and phosphobutyl (meth) acrylate; phosphoalkyl crotonates, phosphoalkyl maleates, phosphoalkyl fumarates, phosphodialkyl (meth)acrylates, phosphodialkyl crotonates, vinyl phosphates, and (meth)allyl phosphate. Preferred are phosphoalkyl methacrylates. Other suitable phosphorus acid monomers may include dihydrogen phosphate-functional monomers such as allyl phosphate, mono- or diphosphate of bis(hydroxy-methyl) fumarate or itaconate; phosphonate functional monomers, including, for example, vinyl phosphonic acid, allyl phosphonic acid, 2-acrylamido-2-methyl-propanephosphonic acid, α-phosphonostyrene, 2-methyl-acrylamido-2-methylpropanephosphonic acid; 1,2-ethylenically unsaturated (hydroxy)phosphinylalkyl (meth)acrylate monomers; and oligomeric phosphorus acid monomers, such as diphosphomonoalkyl (meth)acrylates, i.e. (meth)acryloyloxyalkyl diphosphate, triphosphomonoalkyl (meth)acrylates, and metaphosphomonoalkyl (meth)acrylates and polyphosphomonoalkyl (meth)acrylates.

Suitable phosphorus acid functional acrylic copolymers may be prepared by first preparing a precursor polymer which contains a pendant first co-reactive epoxy group which can be reacted with a compound containing a second co-reactive group and a phosphorus acid group. For example one can prepare a precursor polymer using glycidyl (meth) acrylate. Suitable second co-reactive groups on the compound including a second co-reactive group and phosphorus acid group are amine, hydroxyl, and phosphoric acid anhydride. An epoxy functional precursor polymer can be reacted with polyphosphoric acid, or glyphosate to generate a phosphorus acid functional acrylic copolymer with internal pendant phosphorus acid groups.

Any suitable acrylic copolymers may be formed by conventional polymerization methods in the presence of a thermal or redox initiator. Organic solvent polymerization may be performed in the case of epoxy functional acrylic copolymers. In other cases, aqueous emulsion polymerization may be performed.

The powder coating compositions, in addition to the epoxy functional acrylic resin, also comprise one or more crosslinkers, preferably a flexibilizing crosslinker. The crosslinker is added in a stoichiometry of about 0.7 to about 1.3:1 acid to epoxy in the acrylic copolymer, preferably about 0.95 to about 1.05:1; and suitable amounts of crosslinker may range from 5 to 35 wt. %, based on the total weight of the powder coating composition. Suitable crosslinkers may include any that react with epoxy groups without causing yellowing in the product coating, e.g. di- or polyacids, anhydrides or dianhydrides. In an embodiment, crosslinkers may preferably include organic dicarboxylic acids and their anhydrides, such as sebacic acid, adipic acid, azelaic acid and dodecanedioic acid, and adducts made from esterification of organic dicarboxylic acids or anhydrides with polyesters or polyols. The crosslinker can help to improve the chip resistance of coatings made from the powder coating composition.

The powder coating composition may additionally comprise one or more adhesion promoter comprising any epoxy resin or isocyanate compound or prepolymer having a $T_g$ of 40° C. or higher, such as, for example, epoxy resins, epoxy-phenolic novolac resins, dimers and trimers of isophorone diisocyanate (IPDI), hexamethylene diisocyanate (HMDI) or toluene diisocyanate, blocked isocyanates, such as caprolactam blocked IPDI, and isocyanate terminated prepolymers of diisocyanates or their dimers or trimers with a polyol or glycol. Preferred adhesion promoters are bisphenol epoxy resins, more preferably bisphenol A or bisphenol F epoxy resins. Suitable amounts of adhesion promoter may range from about 0.1 wt. % to about 10 wt. %, based on the total weight of the powder coating composition, in another embodiment preferably from 0.2 to 3 wt. %, and in another embodiment, more preferably from about 0.1 to about 1 wt. %. Amounts of greater than about 3 wt. % can contribute to weatherability problems.

To aid in filiform corrosion resistance, the powder coating compositions may further comprise from about 0.1 wt % to about 1.5 wt. %, based on the total weight of the powder coating composition of one or more hydrophobic submicron particle, such as an inorganic oxide, e.g. a metal oxide or silica, and an organosilicon compound, e.g. polydimethyl siloxane (PDMS) treated fume silica.

Optionally, hydrolyzable silanes, e.g. alkoxysilanes, may also be used in the amount of from about 0.01 to about 3 wt. %, in another embodiment preferably, about 0.01 wt % to about 0.3 wt. %, based on the total weight of the powder coating composition to couple fillers and inorganic oxide pigments into the coating matrix. Examples of suitable silanes include glycidyl alkoxy silanes and amino alkoxy silanes, such as glycidyl trimethoxy silane.

The powder coating composition compositions further may optionally comprise one or more light stabilizers or ultraviolet (UV) absorbers to aid in weatherability. Such a light stabilizer or UV light absorber may be used in amounts of from about 0.1 to about 15 phr, preferably from about 0.1 phr to about 5 phr. Suitable light stabilizers include, for example, hindered amines, such as poly(alkanoyl piperidine alcohols), e.g. oligomers of dimethyl succinate with 4-hydroxy tetramethyl piperidine ethanol, hindered phenols, or combinations thereof; suitable UV light absorbers include, for example, benzotriazoles, oxalic acid diarylamides, and 2-hydroxy benzophenone.

Small amounts, e.g. from about 0.001 wt % to about 0.10 wt. %, based on the total weight of the powder coating composition, preferably, from about 0.001 wt. % to about 0.05 wt. %, of organic pigments, such as phthalocyanines may be included to control yellowing. The powder coating composition may additionally comprise any of from about 0.001 to about 1.0 wt. %, based on the total weight of the powder coating composition, of optical brighteners and/or leveling agents; from about 0.1 to about 10 phr, based on the total weight of the powder coating composition, of one or more flatting agent, such as alkyl (meth)acrylate copolymers, from about 0.01 phr to about 6 phr of one or more waxes; and from about 0.01 to about 1.0 wt. %, based on the total weight of the powder coating composition, of post blend additives, such as dry flow aids like silica and fume alumina.

Powder coating compositions are produced according to conventional methods. The components may be blended, and then intimately mixed, such as, for example, by melt-compounding so that no significant curing occurs. The molten compound may be extruded, and after extrusion, rapidly cooled, followed by grinding and, as necessary, sorting the particulates according to size. Optionally, in another embodiment, the powder coating compositions may be produced by bonding particles comprising acrylic copolymer with the hydrophobic submicron particle to form agglomerate particles.

The powder coating compositions may be applied via conventional means. For electrostatic coating, the average size of the particles may range from about 5 to about 200 µm, in another embodiment preferably about 25 µm or more, and about 75 µm or less.

Once applied the coatings are cured thermally, for example, at temperatures of from about 90 to about 250° C. for a period of from about 30 seconds to about 90 minutes. Heat for thermal cure may come from a convection, infrared (IR) or near IR source.

Suitable substrates may include, for example aluminum, forged alloys, iron, steel, magnesium alloy, such as electronic goods and brass, such as lock and door hardware. Aluminum substrates may include, for example, aluminum silicon alloys, aluminum lithium alloys, aluminum magnesium, aluminum zinc, aluminum manganese, aluminum copper base alloys such as aluminum bronze, and the like. The alloys may be single, binary, or have more than two metals.

In an embodiment, the substrates are preferably pretreated. Aluminum and forged alloy substrates may be pretreated with, for example, a self-assembled monolayer of phosphorus organic material; zirconium titanates or acrylic modified zirconium titanate. Steel and iron substrates may be pretreated with passivating agents, such as zinc phosphate or iron phosphate.

In an embodiment, the resin has a $T_g$ of greater than 85° C., and in another embodiment preferably about 90° C. or greater, and in still yet another embodiment more preferably from about 90° C. to about 100° C. Retaining a suitable acrylic copolymer $T_g$ ensures adequate blocking resistance or package stability while retaining adequate flow and film-forming properties.

The examples set forth below are provided to illustrate embodiments of the epoxy functional acrylic resins and powder coating compositions described herein and are not intended to limit the scope of the claimed invention.

EXAMPLES

Resin Synthesis Examples

Synthesis Example 1 (Control Example)

1050 grams of butyl acetate was charged to a 4-necked 5-liter round bottom glass reactor equipped with a mechanical stirrer, a condenser, a nitrogen inlet and bubbler, a temperature measuring probe and a monomer/initiator feed tube. The flask was heated under reflux (at approximately 127° C.) with a nitrogen atmosphere. A monomer mixture was prepared by adding 441 grams of butyl methacrylate, 606.2 grams of glycidyl methacrylate (97% active), 286.4 grams of Isobornyl methacrylate (88% active), 735 grams of methyl methacrylate, 84 grams of styrene and 223.2 grams of butyl acetate in a 5-liter container. An initiator solution was prepared by mixing 138.6 grams of TRIGONOX® 21S (tert-butyl peroxy-2-ethylhexanoate) initiator and 137.6 grams of butyl acetate. The monomer mixture and the initiator mixture were combined in one container. The nitrogen flow was turned off to the reactor. The monomer and initiator mixture was fed into the reactor over 4 hours. When the monomer and initiator feed was completed the feed line was rinsed with 48.5 grams of butyl acetate. The reaction mixture was cooled to approximately 115° C. and held at that temperature for a combined time of 30 minutes. A mixture of 11.5 grams of TRIGONOX® 21S in 110 grams of butyl acetate was added to the flask over 60 minutes. When the addition of TRIGONOX® 21S solution was completed the line was rinsed with 10.5 grams of butyl acetate. The reaction was maintained at approximately 115° C. for an additional 30 minutes and then cooled to room temperature.

$T_g$ (calculated)=72.0° C.
Mw=7489
Mn=3025
EEW=518
SP=9.12
f/m=14.5

Synthesis Example 2 (Control Example)

1050 grams of butyl acetate was charged to a 4-necked 5-liter round bottom glass reactor equipped with a mechanical stirrer, a condenser, a nitrogen inlet and bubbler, a temperature measuring probe and a monomer/initiator feed tube. The flask was heated under reflux (at approximately 127° C.) with a nitrogen atmosphere. A monomer mixture was prepared by adding 441 grams of butyl methacrylate, 606.2 grams of glycidyl methacrylate (97% active), 286.4 grams of Isobornyl methacrylate (88% active), 735 grams of methyl methacrylate, 84 grams of styrene and 223.2 grams of butyl acetate in a 5-liter container. An initiator solution was prepared by mixing 155.6 grams of TRIGONOX® 21S (tert-butyl peroxy-2-ethylhexanoate) initiator and 154 grams of butyl acetate. The monomer mixture and the initiator mixture were combined in one container. The nitrogen flow was turned off to the reactor. The monomer and initiator mixture was fed into the reactor over 4 hours. When the monomer and initiator feed was completed the feed line was rinsed with 48.5 grams of butyl acetate. The reaction mixture was cooled to approximately 115° C. and held at that temperature for a combined time of 30 minutes. A mixture of 11.5 grams of TRIGONOX® 21S in 110 grams of butyl acetate was added to the flask over 60 minutes. When the addition of TRIGONOX® 21S solution was completed the line was rinsed with 10.5 grams of butyl acetate. The reaction was maintained at approximately 115° C. for an additional 30 minutes and then cooled to room temperature.

$T_g$ (calculated)=72.0° C.
Mw=5375
Mn=2220
EEW=529
SP=9.12
f/m=10.2

Synthesis Example 3 (According to the Present Invention)

1050 grams of butyl acetate was charged to a 4-necked 5-liter round bottom glass reactor equipped with a mechanical stirrer, a condenser, a nitrogen inlet and bubbler, a temperature measuring probe and a monomer/initiator feed tube. The flask was heated under reflux (at approximately 127° C.) with a nitrogen atmosphere. A monomer mixture was prepared by adding 606.2 grams of glycidyl methacrylate (97% active), 358 grams of Isobornyl methacrylate (88% active), 1113 grams of methyl methacrylate, 84 grams of styrene and 223.2 grams of butyl acetate in a 5-liter container. An initiator solution was prepared by mixing 147.1 grams of TRIGONOX® 21S (tert-butyl peroxy-2-ethylhexanoate) initiator and 154 grams of butyl acetate. The monomer mixture and the initiator mixture were combined in one container. The nitrogen flow was turned off to the reactor. The monomer and initiator mixture was fed into the reactor over 4 hours. When the monomer and initiator feed was completed the feed line was rinsed with 48.5 grams of butyl acetate. The reaction mixture was cooled to approximately 115° C. and held at that temperature for a combined time of 30 minutes. A mixture of 11.5 grams of TRIGONOX® 21S in 110 grams of butyl acetate was added to the flask over 60 minutes. When the addition of TRIGONOX® 21S solution was completed the line was rinsed with 10 grams of butyl acetate. The reaction was maintained at approximately 115° C. for an additional 30 minutes and then cooled to room temperature.

$T_g$ (calculated)=93.9° C.
Mw=5629
Mn=2363
EEW=520
SP=9.24
f/m=10.8

Synthesis Example 4 (According to the Present Invention)

1050 grams of butyl acetate was charged to a 4-necked 5-liter round bottom glass reactor equipped with a mechanical stirrer, a condenser, a nitrogen inlet and bubbler, a temperature measuring probe and a monomer/initiator feed tube. The flask was heated under reflux (at approximately 127° C.) with a nitrogen atmosphere. A monomer mixture was prepared by adding 606.2 grams of glycidyl methacrylate (97% active), 286.4 grams of Isobornyl methacrylate (88% active), 1176 grams of methyl methacrylate, 84 grams of styrene and 222.4 grams of butyl acetate in a 5-liter container. An initiator solution was prepared by mixing 152.4 grams of TRIGONOX® 21S (tert-butyl peroxy-2-ethylhexanoate) initiator and 151.4 grams of butyl acetate. The monomer mixture and the initiator mixture were combined in one container. The nitrogen flow was turned off to the reactor. The monomer and initiator mixture was fed into the reactor over 4 hours. When the monomer and initiator feed was completed the feed line was rinsed with 48.5 grams of butyl acetate. The reaction mixture was cooled to approximately 115° C. and held at that temperature for a combined time of 30 minutes. A mixture of 11.5 grams of TRIGONOX® 21S in 110.5 grams of butyl acetate was added to the flask over 60 minutes. When the addition of TRIGONOX® 21S solution was completed the line was rinsed with 10 grams of butyl acetate. The reaction was maintained at approximately 115° C. for an additional 30 minutes and then cooled to room temperature.

$T_g$ (calculated)=92.3° C.
Mw=6676
Mn=2609
EEW=506
SP=9.28
f/m=12.9

Synthesis Example 5 (According to the Present Invention)

1050 grams of butyl acetate was charged to a 4-necked 5-liter round bottom glass reactor equipped with a mechanical stirrer, a condenser, a nitrogen inlet and bubbler, a temperature measuring probe and a monomer/initiator feed tube. The flask was heated under reflux (at approximately 127° C.) with a nitrogen atmosphere. A monomer mixture was prepared by adding 606.2 grams of glycidyl methacrylate (97% active), 286.4 grams of Isobornyl methacrylate (88% active), 1071 grams of methyl methacrylate, 105 grams of butyl methacrylate, 84 grams of styrene and 353.7 grams of butyl acetate in a 5-liter container. An initiator solution was prepared by mixing 147.1 grams of TRIGONOX® 21S (tert-butyl peroxy-2-ethylhexanoate) initiator and 154 grams of butyl acetate. The monomer mixture and the initiator mixture were combined in one container. The nitrogen flow was turned off to the reactor. The monomer and initiator mixture was fed into the reactor over 4 hours. When the monomer and initiator feed was completed the feed line was rinsed with 48.5 grams of butyl acetate. The reaction mixture was cooled to approximately 115° C. and held at that temperature for a combined time of 30 minutes. A mixture of 11.5 grams of TRIGONOX® 21S in 130.5 grams of butyl acetate was added to the flask over 60 minutes. When the addition of TRIGONOX® 21S solution was completed the line was rinsed with 10 grams of butyl acetate. The reaction was maintained at approximately 115° C. for an additional 30 minutes and then cooled to room temperature.

$T_g$ (calculated)=87.3° C.
Mw=5669
Mn=2362
EEW=516
SP=9.24
f/m=11.0

The content of each of the Synthesis Examples 1-5 is shown in Table 3, along with its properties.

Test Methodologies

Film Thickness:

Dry film thickness was measured using a POSITECTOR™ Model 6000-FN1 Coating Thickness Gauge from DeFelsko Corporation, Ogdensburg, N.Y., the film thickness was measured according ASTM D 1400-00 "Standard Test Method for Nondestructive Measurement of Dry Film Thickness of Nonconductive Coatings Applied to a Nonferrous Metal Base", 2000. Film thickness is reported as the range (low to high) of three readings measured in the center portion of the panel.

Crosshatch Adhesion:

Coatings were tested in accordance with the adhesion test method published by the American Society For Testing And Materials (ASTM) using the method D3359-02, "Standard Test Methods for Measuring Adhesion by Tape Test", Test Method B—Cross-Cut Tape Test (2002). This method provides for cutting through the film in a crosshatch pattern of specified spacing, and taping the cut area with Elcometer 99 tape, and then rapidly removing the tape. The cut area is then inspected to determine if paint has been loosened or removed, and the area is given a rating.

A rating of 5B is a perfect rating, requiring that none of the coating be removed. A rating of 0B would indicate that 65% or more of the coating was removed, thereby showing poor adhesion of the coating to the substrate. The Minimum acceptable adhesion rating is 3B.

General Motors Copper-Accelerated Acetic Acid Salt Spray (CASS) Test GMW14458 (ISO 9227: 2006E).

CASS Resistance testing of powder coatings applied to machined aluminum plaques (acquired by Custom Alloy Light Metals, City of Industry, Calif. USA of aluminum alloy A356 ingot), was conducted by cutting a scribe through the coating down to the substrate (approximately 70 mm scribe length) perpendicular to the machining lines with a carbide-tip scribing tool/fixture per SAE J2634. A continuity check was conducted down the full length of the scribe to ensure exposure down to the base metal. The scribed plaques were placed in an accelerated salt spray chamber (Q-Lab) equipped with air pressurized atomizer for a solution of 50±5 g/L sodium chloride (NaCl) and 0.26±0.02 g/L copper (II) chloride dihydrate ($CuCl_2.2H_2O$) in DI Water having a pH from 3.1 to 3.3 at a temperature of 50° C.±2° C. for a period of 168 hours. The lengths of all of the filaments on each specimen are measured with a metric ruler and the maximum creepage (longest filament length) is reported.

SAE J2635 (August 2007) Filiform Corrosion Test Procedure for Painted Aluminum Wheels and Painted Aluminum Wheel Trim:

Filiform Resistance testing of powder coatings applied to machined aluminum plaques (acquired by Custom Alloy Light Metals, City of Industry, Calif. U.S.A. of aluminum alloy A356 ingot), was conducted by cutting a scribe through the coating down to the substrate (approximately 70 mm scribe length) perpendicular to machining lines with a carbide-tip scribing tool/fixture per SAE J2634. A continuity check was conducted down the full length of the scribe to ensure exposure down to the base metal. The scribed plaques were placed in a CASS chamber per ASTM B 368-97 (2003) such that the plaque and scribe were at an angle of approximately 45 degrees to the horizontal on a non-metallic rack. The plaques were exposed to 6 hours in the CASS cabinet as described in ASTM B 368-97 (2003). After CASS, a 3 second vertical, 90 degree oscillating-turn rinse of constant flow DI water was conducted on every plaque. The plaques were placed into a humidity cabinet within 15 minutes after rinsing. All plaques in the humidity chamber were positioned so that droplets of moisture run off the part at approximately 45 degrees. The plaques were exposed inside the humidity chamber for 672 hours.

Maximum filiform growth for each plaque was assessed every 168 hours. The lengths of all of the filaments on each specimen are measured with a metric ruler and average creepage (length of the filaments) and the maximum creepage (longest filament length) are reported.

Impact Resistance:

Impact Resistance testing was conducted with a BYK Heavy-Duty Impact Tester, model G1120, following ASTM D 2794-93 "Standard Test Method for Resistance of Organic Coatings to the Effect of Rapid Deformation (Impact). The maximum force in inch-pounds the coating withstood is reported without the appearance of cracking. The four-pound weight was used for testing.

Blocking Resistance:

The test method provides an evaluation of the resistance of a coating powder to blocking, caking or sintering. An apparatus containing a glass test tube 150 mm long and 25 mm in diameter, a nylon or ceramic cylinder approximately 20 mm in height and approximately 22.5 mm in diameter so that the cylinder should slide freely in the tube, lead shot and an oven capable of maintaining 110±1° F. was assembled. The test tube was filled with powder to a measured height of 30 mm. The cylinder was placed on top of the powder sample in the test tube so as not to disturb the integrity of the sample and avoid premature compaction. Lead shot was placed on top of the cylinder so that the weight of shot and cylinder combined totaled to 100±1 g. The whole assembly with the test tube orientated vertically was placed in an oven with an internal air temperature of 110±1° F. After 24 hours, the test tube containing the weighted powder sample was removed from the oven and allowed to cool to room temperature. The cylinder and lead shot was carefully poured out of the test tube so as not to disturb the powder. The sample of exposed powder was visually assessed for extent of blocking and given a rating via the scale described in Table 2. The test can also be extended out for a longer period of time, checking the extent of blocking in 24H intervals. The maximum acceptable blocking resistance is a rating of 4 after a 24H test.

TABLE 2

Blocking Resistance Ratings

| Test Rating | Rating Description |
|---|---|
| 1 | Powder is free-flowing, no sign of lumps or agglomeration. |
| 2 | Powder is free-flowing, but contains a few lumps or agglomerates which are easily broken down into powder. |
| 3 | Powder is free-flowing, but contains a moderate number of lumps or agglomerates which are easily broken down into powder. |
| 4 | Powder is caked, but is easily broken down into powder when removed from the test tube. |
| 5 | Powder is caked, and is moderately difficult to break down into powder when removed from the test tube. |
| 6 | Powder is caked, and is difficult to break down into powder when removed from the test tube. |
| 7 | Powder is caked, can be broken apart, but not into powder that is free from agglomerates. |
| 8 | Powder is fused into a solid lump that can be broken with difficulty into moderate sized pieces. |
| 9 | Powder is fused into a solid lump that can be broken with difficulty into a few large pieces. |
| 10 | Powder is fused into a solid lump and is no longer identifiable as having once been a powder. |

ICM Grinding:

Milling was conducted in an ICM 2.4 95/158 CX/System 110-PSR 11 (Neuman & Esser, Übach-Palenberg, Germany) with a 8 pin mill and 46 teeth impact classifier at settings of 84 m/s for the speed mill and 11 m/s for the classifier having an intake air flow of 90-110 ft$^3$/min.

Examples 1 to 5: Formulation and Application

The powder coating compositions of Examples 1-5 were formed from the ingredients listed in Table 4 according to a method wherein the raw ingredients were blended in a Prism mixer for 30 seconds @ 2000 RPM, then extruded in a ZSK-30 (Coperion Werner & Pfleiderer, Stuttgart, Germany) at 400 rpm, 20-30% torque and 77-110° C. (170-230° F.) barrel temperature setting. The resulting molten extruded mixture was fed through cooled chill-rolls to form a solid sheet that was subsequently granulated into chip form. Post blend (dry flow) additives were mixed with the chips by bag-shaking for 0.25-0.5 min. The post blend treated chips were then ground to a fine powder in a ZM lab mill (Retsch, Wuppertal-Haan, Germany) at 20.000 rpm using a 1.0 mm screen size screen. The resulting ground powder was screened through a 74 μm (200 mesh) size sieve for subsequent application to form coatings and was applied to the indicated substrate with a Versa-Spray (Nordson Corp., Westlake, Ohio) electrostatic spray gun to the indicated thickness and was cured at 176.6° C. (375° F.) for 15 min in electric heated lab oven Blue M DC-206G (SPX Thermal Product Solutions, White Deer, Pa.).

TABLE 3

Synthesis Examples

| Monomer Compositions | Synthesis Example 1 | Synthesis Example 2 | Synthesis Example 3 | Synthesis Example 4 | Synthesis Example 5 |
|---|---|---|---|---|---|
| GMA | 28 | 28 | 28 | 28 | 28 |
| IBOMA | 12 | 12 | 15 | 12 | 12 |
| MMA | 35 | 35 | 53 | 56 | 51 |
| STY | 4 | 4 | 4 | 4 | 4 |
| BMA | 21 | 21 | 0 | 0 | 5 |
| Calculated $T_g$ (° C.) | 72.0 | 72.0 | 93.9 | 92.3 | 87.3 |
| SPc (cal/cm$^3$)$^{1/2}$ | 9.12 | 9.12 | 9.24 | 9.28 | 9.24 |
| Mw | 7489 | 5375 | 6676 | 6676 | 5669 |
| Mn | 3025 | 2220 | 2363 | 2609 | 2362 |
| EEW | 518 | 529 | 520 | 506 | 516 |
| f/M | 14.5 | 10.2 | 10.8 | 12.9 | 11.0 |

TABLE 4

Powder Formulation Examples

| | EXAMPLE | | | | |
|---|---|---|---|---|---|
| | 1 | 2 | 3 | 4 | 5 |
| Raw Material | Amount (weight percent) | | | | |
| Synthesis Example 1 Resin | 80.42 | | | | |
| Synthesis Example 2 Resin | | 80.66 | | | |
| Synthesis Example 3 Resin | | | 80.42 | | |
| Synthesis Example 4 Resin | | | | 80.03 | |
| Synthesis Example 5 Resin | | | | | 80.32 |
| [1]Sebacic Acid | 15.78 | 15.54 | 15.78 | 16.16 | 15.87 |
| [2]Benzoin | 0.96 | 0.96 | 0.96 | 0.96 | 0.96 |
| [3]Acrylate copolymer flow modifier | 0.96 | 0.96 | 0.96 | 0.96 | 0.96 |
| [4]Polyester of dimethyl succinate with 4-hydroxy tetramethyl piperidine ethanol | 0.48 | 0.48 | 0.48 | 0.48 | 0.48 |
| [5]Triazine | 0.48 | 0.48 | 0.48 | 0.48 | 0.48 |

TABLE 4-continued

Powder Formulation Examples

| Raw Material | EXAMPLE | | | | |
|---|---|---|---|---|---|
| | 1 | 2 | 3 | 4 | 5 |
| | Amount (weight percent) | | | | |
| [6]Organophosphite antioxidant | 0.34 | 0.34 | 0.34 | 0.34 | 0.34 |
| [7]Phenolic antioxidant | 0.34 | 0.34 | 0.34 | 0.34 | 0.34 |
| [7]Bis Benzoxazoles | 0.002 | 0.002 | 0.002 | 0.002 | 0.002 |
| [8]Dioxazine violet | 0.004 | 0.004 | 0.004 | 0.004 | 0.004 |
| [9]Glycidyl trimethoxy silane | 0.24 | 0.24 | 0.24 | 0.24 | 0.24 |
| Fumed aluminum oxide - Dry flow | 0.2 | 0.2 | 0.2 | 0.2 | 0.2 |

[1]Sebacic Acid, ICC Chemical Corp., Warrenville, IL.
[2]Mi Won benzoin, GCA Chemical Corp., Bradenton, FL.
[3]Resiflow™ PL 200, Estron Chemical, Calvert City, KY.
[4]UVAsorb™ HA22, 3V Inc, Charlotte, NC
[5]Tinuvin™ 405, BASF Pigments and Resins, Ludwigshafen, Germany.
65. Ultranox™ 626, Addivant, Inc, Middlebury, CT.
[6]Irganox™ 1076, BASF Plastic Additives, Basel, Switzerland.
[7]Optiblanc™ PL, 3V Inc, Weehawken, NJ.
[8]Hostaperm™ 14-4006 Violet RL SP, Clariant, Charlotte, NC.
[9]Xiameter™ OFS-6040 Silane, Dow Corning Corp., Midland, MI.
[10]Aeroxide™ C, Evonik Corp., Parsippany, NJ Preparation The aluminum substrate used for corrosion resistance testing (Filiform and CASS) is prepared in the following manner. Raw aluminum ingot of alloy A356 (acquired from Custom Alloy Light Metals, City of Industry, Calif.) was cut into dimensions of 3.5×3.5×0.25" plaques then machined on both sides with a diamond tipped lathe having an approximate width of 300 microns for each machining line. Surface treatment of the aluminum plaques was conducted by a commercial pretreatment company with the following four stages in chronological order with DI water rinses in-between steps. Stages: Mild alkaline cleaner, acid deoxidizer solution, non-chrome conversion of zirconium titanate and self-assembled monolayer of phosphorous organic material. A final dryoff of 140° C. for 15 minutes in an electric oven was conducted to ensure the substrate was fully dry prior to packaging. The pretreated aluminum plaques were then vacuum sealed in a bag and powder coated within 24 hours of pretreatment. The coatings were cured for 15 minutes to achieve a substrate surface temperature of 176.6° C. (350° F.) to give films having thicknesses of 50-75 μm (approximately 2.0-3.0 mils).

TABLE 5

Results

| | Example | | | | |
|---|---|---|---|---|---|
| | 1 | 2 | 3 | 4 | 5 |
| Film Thickness (mils) | 2.0-3.0 | 2.0-3.0 | 2.0-3.0 | 2.0-3.0 | 2.0-3.0 |
| Impact Resistance, direct (in-lb) (Steel panel) | 20 | 20 | 20 | 20 | 20 |
| Crosshatch Adhesion (Rating B) (Al. panel) | 5B | 5B | 5B | 5B | 5B |
| 24 H Powder Blocking Resistance | 4 | — | 1 | — | — |
| 168 H Powder Blocking Resistance | 8 | — | 3 | — | — |
| SAE J2635 Filiform (Avg. Creepage, mm) (machined Al. plaque) | 3.21 | 2.46 | 1.56 | 1.60 | 1.60 |
| SAE J2635 Filiform (Max. Creepage, mm) (machined Al. plaque) | 6.5 | 6.5 | 4 | 3.5 | 3.5 |
| 240 H GMW14458 CASS (Max. Creepage, mm) (machined Al. plaque) | 4 | 2 | 1.5 | 1.0 | 1.0 |
| BYK Wavescan on Lab Grind (L, S, R values) (Avg. of 3 scans) (Al. panel) | L = 3.3, S = 5.8, R = 9.3 | L = 4.4, S = 8.0, R = 8.6 | L = 4.2, S = 3.8, R = 8.8 | L = 3.8, S = 4.1, R = 8.6 | L = 2.3, S = 3.6, R = 10.1 |
| BYK Wavescan on ICM Grind (L, S, R values) (Avg. of 3 scans) (Al. panel) | — | L = 2.2, S = 2.7, R = 10.1 | L = 2.6, S = 2.8, R = 10.0 | — | — |

As shown in Table 5, Examples 3, 4 and 5 show that a polymer having a $T_g$ greater than 85° C. provides a significant improvement in CASS and filiform corrosion resistance in comparison to commercial epoxy functional acrylic copolymer powder coatings of Examples 1 and 2, which have $T_g$'s below 85° C. Further, this improvement is achieved while retaining the impact resistance and crosshatch adhesion that would be expected to suffer when using a polymer having a higher $T_g$. In addition, as shown in Table 5, the powder coating compositions according to Examples 3, 4 and 5 retain good smoothness properties with a lab grind in comparison to the commercial epoxy functional acrylic copolymer powder coatings in Example 1 and 2 as indicated by the associated BYK Wavescan values. The wavescan values can be further improved with pilot-scale grinding equipment, as illustrated by Example 3, which still does not show a drop in smoothness characteristics compared to Example 2.

In addition, as shown in Table 5, Example 3 demonstrated a marked improvement in resistance to blocking over that exhibited by Example 1. That is, a resin according to the present invention having a relatively high $T_g$ (93.9° C.) showed a demonstrable resistance to blocking at traditional and extended test lengths when subjected to warm conditions that a comparable resin having a much lower $T_g$ (72° C.) did not exhibit.

All documents cited in the Detailed Description of the Invention are, in relevant part, incorporated herein by reference; the citation of any document is not to be construed as an admission that it is prior art with respect to the present invention.

While particular embodiments of the present invention have been illustrated and described herein, the invention is not intended to be limited to the details shown. Rather, various modifications may be made in the details within the range and scope of equivalents of the claims and without departing from the spirit and scope of the invention.

All phrases comprising parenthesis denote either or both of the included parenthetical matter and its absence. For example, the phrase "(co)polymer" includes, in the alternative, polymer, copolymer and mixtures thereof.

Unless otherwise noted, all processes refer to and all examples were performed under conditions of standard temperature and pressure (STP).

All ranges cited herein are inclusive and combinable. For example, if an ingredient may be present in amounts of 0.05 wt. % or more to 1.0 wt. %, and in amounts up to 0.5 wt. %, then that ingredient may be present in amounts of from 0.05 to 1.0 wt. %, from 0.5 to 1.0 wt. % or from 0.05 to 0.5 wt. %.

As used herein, the term "average particle size" shall mean, unless otherwise indicated, the particle diameter or the largest dimension of a particle in a distribution of particles as determined by laser light scattering using a Malvern Mastersizer™ 2000 instrument (Malvern Instruments Inc., Southboro, Mass.) per manufacturer's recommended procedures.

As used herein, the phrase "powder coating" refers to a coating formed from a powder coating composition.

As used herein, the term "copolymer" shall mean any polymer made from two or more different monomers.

As used herein, unless otherwise indicated, the term "glass transition temperature" or "$T_g$" of any resin or (co)polymer is calculated as described by Fox in *Bull. Amer. Physics. Soc.*, 1, 3, page 123 (1956).

As used herein, the term "hybrid" of any (co)polymer or resin shall refer to adducts, grafts or block copolymers and compatible or compatibilized blends of such (co)polymers or resins, such as epoxy polyester hybrids.

As used herein, the term "mass solubility" refers to the calculated solubility in water of a given material determined using the Advanced Chemistry Development (ACD/Labs) Software V9.04 (© 1994-2007 ACD/Labs), and is available in the Chemical Abstracts' Registry.

As used herein, the term "(meth)acrylate" refers to either acrylate or methacrylate and the term "(meth)acrylic" refers to either acrylic or methacrylic.

As used herein, unless otherwise indicated, the term "molecular weight" refers to the weight average molecular weight of a polymer as measured by gel permeation chromatography (GPC) calibrated with polystyrene standards.

As used herein, the term "nonionic comonomer" refers to monomers that do not have acidic groups or salts, basic groups or salts, polyahl groups (e.g. OH, SH, NH), or condensation crosslinking groups.

As used herein, the term "oligoorganosilicon" includes any number from 2 to 20 silicon containing units and the prefix "polyorganosilicon" includes more than 20 silicon containing units.

As used herein, the term "phosphorus acid group" refers to a phosphorus oxo acid having a POH moiety in which the hydrogen atom is ionizable. Also included in the term "phosphorus acid group" are salts of the phosphorus oxo acid, i.e. that have a cation such as a metal ion or an ammonium ion replacing at least one acid proton. Examples of phosphorus acid groups include groups formed from phosphinic acid, phosphonic acid, phosphoric acid, pyrophosphinic acid, pyrophosphoric acid, partial esters thereof, and salts thereof.

As used herein, the term "phr" means the amount, by weight, of an ingredient per hundred parts, by weight, of the resin system. The resin system includes resin or polymer and crosslinking or curing agent.

As used herein, the term "polymer" includes random, block, segmented and graft copolymers, and any mixture or combination thereof.

As used herein, the terms "resin" and "polymer" are interchangeable.

As used herein, the term "resin system" refers to the total of epoxy resin, toughening resin and any crosslinker, curing agent or hardener (but not catalyst) which becomes an integral part of the cross-linked structure.

As used herein, the term "substantially free from (a specified) copolymerized monomer" means that an acrylic copolymer comprises 2 wt. % or less of the copolymerized monomer specified, based on the total weight of copolymerized monomers.

Herein, unless otherwise noted, all percentages are by weight.

The invention claimed is:

1. An epoxy functional acrylic resin comprising, as copolymerized monomers:
   i) from about 10 wt. % to about 40 wt. % of one or more epoxy functional unsaturated monomers;
   ii) from about 10 wt. % to about 20 wt. % of one or more hydrophobic acrylic monomers, and
   iii) from greater than 50 wt. % to about 75 wt. % of at least one nonionic comonomer that is different from the hydrophobic acrylic monomers ii),
      each monomer wt. % based on the total weight of copolymerized monomers in the resin;
   wherein the resin has a $T_g$ of greater than 92 degrees Celsius; and wherein the resin has a calculated solubility parameter from about 9.20 to about 9.30 $(cal/cm^3)^{1/2}$.

2. The epoxy functional acrylic resin of claim 1, wherein the one or more hydrophobic acrylic monomers ii) has a mass solubility in water of 3.5 g/L or less and which would itself form a homopolymer having a glass transition temperature ($T_g$) of about 50 degrees Celsius to about 175 degrees Celsius.

3. The epoxy functional acrylic resin of claim 1, wherein the one or more hydrophobic acrylic monomers ii) is a bicycloalkyl (meth)acrylate.

4. The epoxy functional acrylic resin of claim 3, wherein the bicycloalkyl (meth) acrylate is isobornyl (meth)acrylate.

5. The epoxy functional acrylic resin of claim 1, wherein the one or more hydrophobic acrylic monomers is present in an amount from about 14 wt. % to about 20 wt. %.

6. The epoxy functional acrylic resin of claim 5, wherein the at least one nonionic comonomer iii) is butyl (meth) acrylate or methyl methacrylate.

7. The epoxy functional acrylic resin of claim 1, wherein the at least one nonionic comonomer iii) is a $C_1$ to $C_8$ (cyclo)alkyl ester of (meth)acrylic acid.

8. The epoxy functional acrylic resin of claim 1, further comprising as a copolymerized monomer, about 0.5 wt. % to about 12 wt. % of a vinyl aromatic monomer iv), based on the total weight of copolymerized monomers in the epoxy functional acrylic resin.

9. The epoxy functional acrylic resin of claim 6 wherein the vinyl aromatic monomer iv) is styrene.

10. A powder coating composition comprising:
the epoxy functional acrylic resin of claim 1; and
one or more crosslinkers for the resin.

11. The powder coating composition of claim 10, wherein the one or more crosslinkers is an organic dicarboxylic acid or anhydride, or an adduct thereof with a polyester or a polyisocyanate.

12. The powder coating composition of claim 10, further comprising one or more adjuvants selected from the group consisting of a hydrophobic submicron particle, an adhesion promoter, a light stabilizer, an ultraviolet (UV) absorber and a combination thereof.

13. A coated substrate coated with a powder coating composition, said powder coating composition comprising:
the epoxy functional acrylic resin of claim 1; and
one or more crosslinkers for the resin.

14. The coated substrate of claim 13, wherein the substrate is aluminum or a forged alloy.

* * * * *